Sept. 3, 1940.  J. P. BIRD ET AL  2,213,379
THREADING DEVICE
Filed Jan. 3, 1939  2 Sheets-Sheet 1

INVENTORS
James P. Bird, and
Fred B. Schaffer.
BY
Arthur C. Brown
ATTORNEY

Sept. 3, 1940.    J. P. BIRD ET AL    2,213,379
THREADING DEVICE
Filed Jan. 3, 1939    2 Sheets-Sheet 2
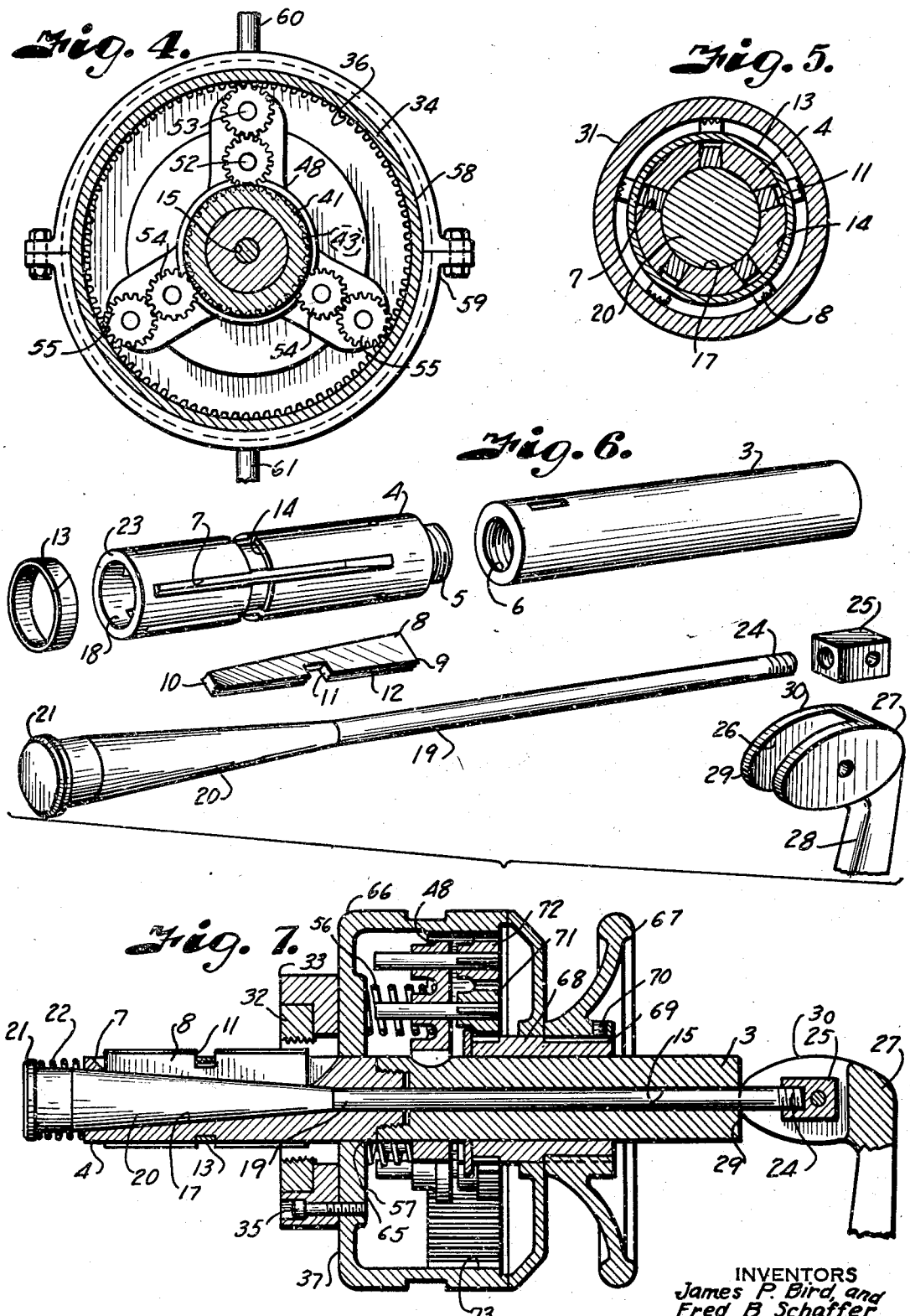
INVENTORS
James P. Bird, and
Fred B. Schaffer
BY Arthur L. Brown
ATTORNEY Patented Sept. 3, 1940

2,213,379

UNITED STATES PATENT OFFICE 2,213,379

THREADING DEVICE

James P. Bird and Fred B. Schaffer, Kansas City, Mo.

Application January 3, 1939, Serial No. 249,006

13 Claims. (Cl. 10—89)

This invention relates to threading devices and more particularly to a device of that character arranged to grip the bore of a tubular member, such as a pipe, and from a thread on the end of the pipe, regardless of the length of the pipe and its inside and outside diameters.

The principal object of the present invention is to provide a pipe threading device capable of accurately, quickly and efficiently chasing threads on the ends of pipe without the necessity of supporting the pipe in a vise or like member.

Other important objects of the present invention are to provide a threading device capable of transport to any place where it is necessary to thread pipe and which is capable of threading such pipe without other accessories; to provide for clamping the threading device in desired position relative to the pipe to be threaded and fixing the threading device to the pipe itself; to provide for facilitating rotating a thread-cutting die in the device relative to the portion of the pipe to be threaded; to provide for normally urging the dies into cutting engagement with the pipe; to provide for chasing threads on pipes of different diameters with the same thread-cutting device; to provide for supporting the thread-cutting device when cutting threads on pipes of large size; to provide for holding the thread-cutting device in alignment with the pipe for facilitating the starting of the thread on said pipe; to provide for increasing the power normally applied to the thread-cutting device during threading operations; and to provide improved elements and arrangements of elements in a threading device of this character.

In accomplishing these and other objects of the present invention, we have provided improved details of structure, the preferred forms of which are illustrated in the accompanying drawings, wherein:

Fig. 4 is a transverse irregular section through our improved threading device on the line 4—4, Fig. 2.

Fig. 5 is a vertical cross-section through the pipe clamping member of the device on the line 5—5, Fig. 3.

Fig. 6 is a detail perspective view of the mandrel and clamping elements of the device, the same being shown in disassembled spaced relation.

Fig. 7 is a vertical longitudinal cross-section through a modified form of threading device, illustrating an arrangement for manually operating the device.

Figure 1:
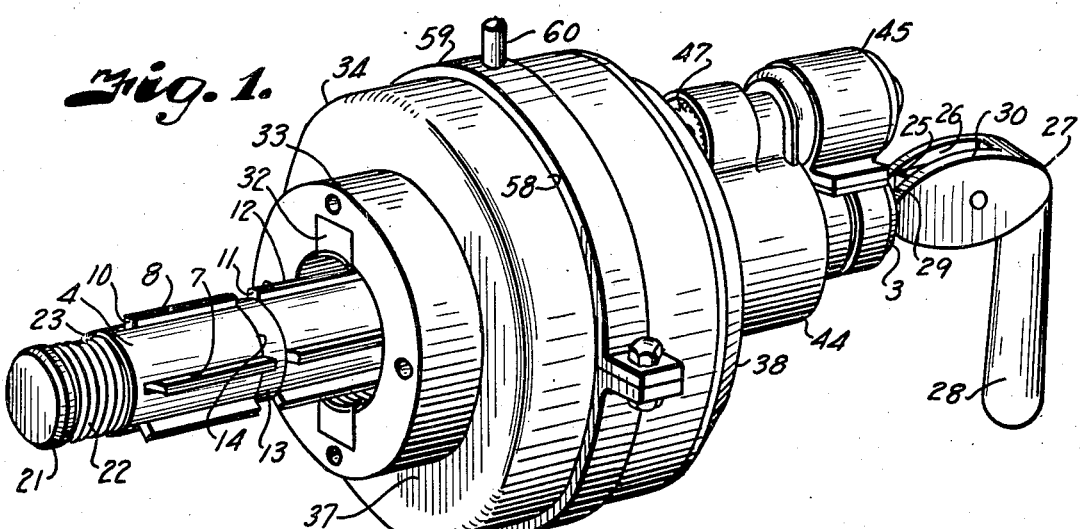
Fig. 1 is a perspective view of a threading device embodying the features of our preferred form of invention.

Referring more in detail to the drawings:

The pipe threading device embodying the features of the present invention preferably consists of a mandrel 2 comprising a pair of mating tubular members 3 and 4, Fig. 6, the member 4 being interengageable with the member 3 in a suitable manner as by a threaded boss 5 on the member 4 engageable in a threaded recess 6 on the inner end of the mandrel member 3. The mandrel member 4 is provided with spaced longitudinally extending slots 7 of a length and width adapting them for slidably seating clamping inserts 8, the clamping inserts 8 each being tapered longitudinally from a wide inner end 9 to a narrow outer end 10 and being provided with a notch 11 substantially intermediate its ends and with longitudinally disposed teeth 12 on its outer side relative to its position when in one of the slots 7.

13 designates a ring which is preferably of split type and arranged to be applied to the mandrel member 4 for seating in an annular groove 14 in the member 4 and in the notches 11 of the clamping inserts 8 to normally retain the inserts against displacement from the slots 7 in the member 4.

The internal bore 15 of the mandrel member 3 is preferably of uniform diameter, and the internal bore of the mandrel member 4 corresponds in size to the bore 15 to a point 16 spaced outwardly from the threaded boss 5 at the inner end of the mandrel member 4 from which point it tapers outwardly as indicated at 17, and terminates in a wide opening 18 relative to the opening to the bore at the inner end of the mandrel member 4.

Figure 3:
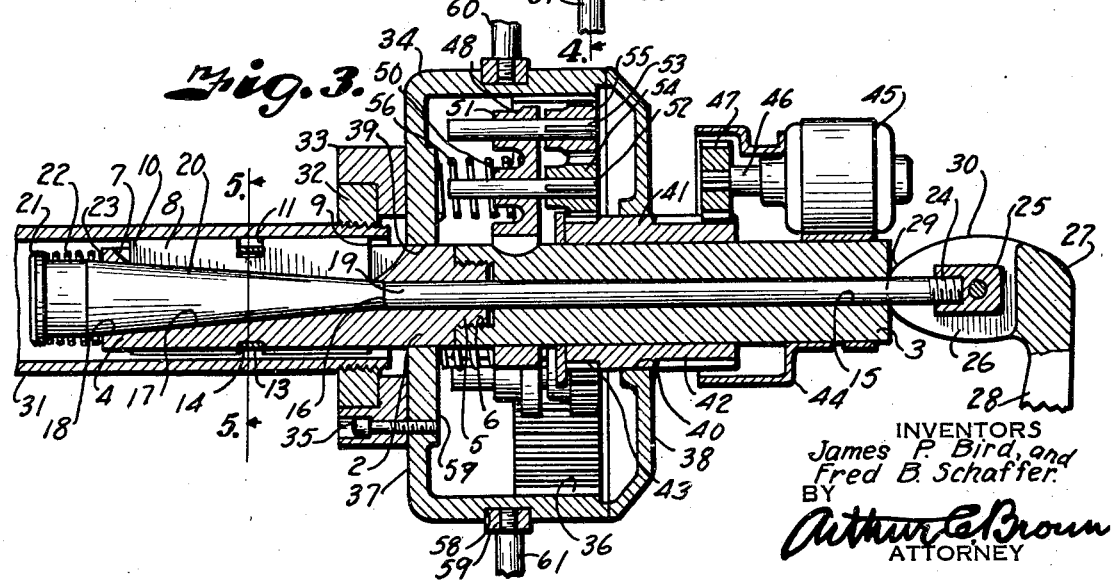
Fig. 3 is a section similar to Fig. 2 showing the device secured to a pipe and illustrating the manner of chasing threads on the pipe.

With the arrangement illustrated, the mandrel members are adapted to slidably receive a cam shaft 19 provided with a tapered cam 20 at one end thereof engageable in the tapered bore 17 of the mandrel member 4, the cam member 20 being arranged to force the clamping inserts 8 outwardly relative to the slots in which they seat when the cam member is moved to the right, as in Fig. 3, against tension of the ring 13.

It is desirable to normally retain the clamping inserts in retracted condition in their seating slots, and to this end, a flange 21 is suitably provided on the outer end of the cam 20 which forms a seat for one end of a coil spring 22, the other end of which seats against a shoulder 23 at the outer end of the mandrel member 4, thus normally tending to move the cam 20 out of the bore 17 of the mandrel member 4 to allow the ring 13 to retain the inserts in retracted condition.

Since the mandrel member 4 is removably mounted on the mandrel member 3, it is apparent that different mandrel members varying in size with respect to their outside diameters may be applied to the members in such a manner as to snugly engage within different sizes of pipes.

In order to effect clamping engagement of the mandrel with a pipe, the end 24 of the cam shaft 19 is preferably mounted on a toggle block 25 which is pivotally mounted between the arms 26 of a lever yoke 27, the lever yoke having an actuating handle 28 or the like attached thereto for actuating the lever. The toggle block 25 is spaced inwardly relative to the cam ends 29 of the lever yoke arms 26 in such a manner that when the longer arcuate edges 30 of the cam arms 26 are in engagement with the outer end of the mandrel member 3, the cam shaft 19 is urged to the left, as in Fig. 2, under tension of the spring 22 on the tapered cam 20 of the shaft 19. When, however, the lever handle 28 is moved for example from the position shown in Fig. 2 to the position shown in Fig. 3, the shorter arcuate edges of the cam arms 26 ride into engagement with the outer end of the mandrel member 3 and move the toggle block 25 outwardly to force the cam shaft 19 to the right against tension of the spring 22. Movement of the cam shaft 19 also moves the tapered cam 20 thereof inwardly in the bore portion 17 to move the clamping inserts 8 outwardly in the slots 7 in such a manner as to effect engagement of the teeth 12 on the inserts in biting relation to the inner surface of a pipe 31 in which the mandrel member 4 has been placed, the mandrel as a whole thus being securely clamped and locked in desired position relative to the pipe 31 which is to be threaded.

32 designates a die of any suitable character adapted to chase threads of desired size on the pipe 31, the die 32 being mounted in a suitable support 33 which, in turn, is supported by a member 34 rotatably mounted on the mandrel, the member 34 preferably being in the form of a housing to which the support 33 is fixed as by fastening devices 35.

In order to rotate the die 32 to chase threads in the pipe 31, it is necessary to rotate the member 34 on the mandrel. A convenient arrangement for so rotating the member 34 is provided by this invention wherein the inner surface of the housing is provided with an internal gear 36.

The die supporting face 37 of the housing member 34, hereinafter referred to as the front face thereof, and the opposite or rear face 38 of the housing are provided with openings 39 and 40 respectively, the bounding edges of the opening 39 being slidably engageable with the mandrel. A sun gear 41 rotatable in the opening 40 is rotatably mounted on the mandrel member 3, the sun gear being provided with a series of long teeth 42 at one end thereof and a series of short teeth 43 on the other end thereof.

Figure 2:
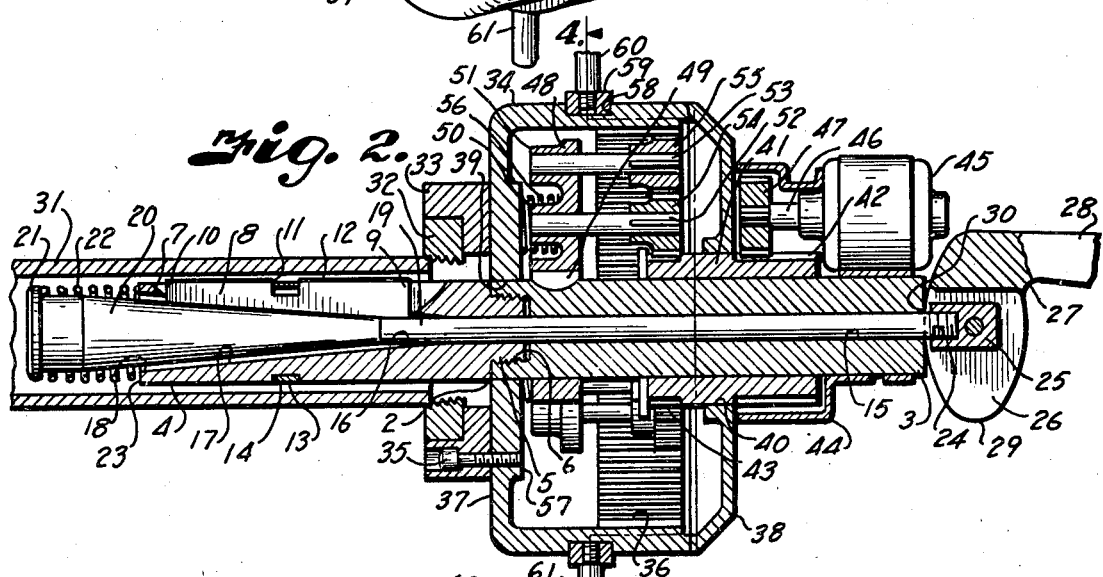
Fig. 2 is a vertical longitudinal section through the threading device illustrated in Fig. 1 showing the device prior to clamping the same to a pipe to be threaded.

44 designates a housing bracket mounted on the mandrel member 3 in surrounding relation to the outer end of the sun gear 41, which bracket supports a driving member 45, such as an electric or like motor, having a drive shaft 46 provided with a pinion 47 operatively engaged with the teeth 42 of the sun gear 41, the pinion 47 normally engaging the teeth 42 of the sun gear adjacent the inner ends of the teeth, as illustrated in Fig. 2.

The force from the motor driven pinion is preferably transmitted, to rotate the housing 34 and chase the threads in the pipe 31, by the provision of a spider 48 keyed, as at 49, adjacent the threaded end of the mandrel member 3. The spider 48 preferably comprises arms extending laterally of the mandrel member 3, which arms are each provided with bearing bosses 50 and 51, Fig. 2, having shafts 52 and 53 rotatably mounted therein. The shafts have planetary gears 54 and 55 thereon respectively, the planetary gears 54 meshing with the short teeth 43 of the sun gear 41 and with the teeth of the planetary gears 55. The teeth of the planetary gears 55 also mesh with the teeth of the internal gear 36 in the housing member 34, it thus being apparent that when the motor 45 is actuated its power is transmitted through the pinion 47 through the sun gear 41 and from the sun gear 41 through the planetary gears 54 and 55 to the internal gear 36 of the housing to rotate the housing and turn the die 32 to chase teeth in the pipe.

While sun and planetary gears have been illustrated for transmitting motive power to chase teeth in a pipe, such illustration is by way of example, it being apparent that beveled gears or other suitable gear reduction mechanisms for increasing the motive power ultimately applied to the thread-cutting die may be provided without departing from the spirit of the present invention.

In order to urge the die 32 into thread-chasing engagement with the pipe, springs 56 are preferably mounted on the ends of the shafts 52 opposite the planetary gears 54, the ends of which springs bear against the inner face 57 of the housing face 37 and against the arms of the spider 48. Since the spider is keyed to the mandrel and since the housing is rotatably and slidably mounted on the mandrel, the springs tend to move the housing to the left, as shown in Figs. 2 and 3, thus maintaining the die in threadchasing contact with the pipe.

Where large pipe is to be threaded, it has been found desirable to additionally support the thread-cutting device and to this end, an annular groove 58 is provided in the housing member 34 for rotatably mounting a yoke 59 therein. Trunnions 60 and 61 are mounted in the yoke 59, preferably in oppositely disposed relation to each other, which trunnions may be employed both for engagement with suitable suspending tackle, not shown, and for manual engagement to aid in urging the housing toward the pipe and the die longitudinally along the pipe when in cutting relation thereto.

The operation of a threading device constructed as described is a follows:

The size of the pipe to be threaded having been determined, a mandrel member 4 of suitable size, relative to the pipe to be threaded, is mounted in the mandrel member 3 and is then inserted within the end of the pipe to be threaded. A suitable die having been applied to the housing member 34, the housing member is moved to the left to compress the spider springs 56 and cause the die to engage the end of the pipe as illustrated in Fig. 2. The lever member, which is normally in the position shown in Fig. 2, is then actuated to draw the cam shaft to the right, as in Figs. 2 and 3, to cause the cam 20 in the mandrel member 4 to force the clamping inserts outwardly into biting or clamping engagement with the inner surface of the pipe, the short arcuate cam faces of the lever yoke arms at that time engaging the outer end of the mandrel 3 to hold the lever in dead-center position and thus maintain the clamping action of the clamping inserts on the pipe.

The motor is then actuated, the power from which is transmitted through the drive shaft 46, pinion 47, and sun gear 41 to the planetary gears 54, and from the planetary gears 55 through the planetary gears 55 to the internal gear 36 into the housing, thus rotating the housing and the die to chase the threads in the pipe.

If desired, the trunnions on the housing may also be employed to force the housing toward the pipe in conjunction with the springs 56 which bear against the spider and inherently force the housing toward the pipe to maintain the die in thread-chasing contact with the pipe.

It is apparent that the motor is effective in driving the die throughout its thread chasing action by reason of the motor pinion riding outwardly along the teeth of the sun gear 41, thus allowing the housing to move away from the motor during rotation and thread-cutting action of the die.

When suitable threads have been chased in the pipe, the motor is stopped; the direction of rotation of the housing is then reversed or other suitable means used to remove the die from the pipe, and the cam lever is moved from its dead-center position illustrated in Fig. 3 to allow the spring 22 on the cam shaft to withdraw the cam 20 from the bore 17 to release the clamping inserts from engagement with the pipe. The mandrel may then be removed from the pipe after the pipe is properly threaded.

In Fig. 7, a modified form of the present invention is illustrated, wherein the mandrel 65 and housing member 66 are substantially similar to that of the preferred form of the invention, a manually operated driving member 67 being provided in the modified form of invention which preferably consists of a hand wheel keyed to the sun gear 68 as shown at 69 and retained against longitudinal displacement as by a set screw 70.

The operation of the modified form of invention is substantially similar to that of the preferred form, the difference being that the hand wheel may be manually turned to rotate the sun gear, the planetary gears 71 connected therewith as well as the planetary gears 72 and internal gear 73 in the housing respectively to rotate the housing and drive the die 32.

It is apparent, therefore, that a pipe threading device has been provided by the present invention which avoids the necessity for mounting a pipe to be threaded in a vise or similar support and which thus makes the device available for use in the field or at any place at which it is necessary to provide threads on pipes of different sizes.

What we claim and desire to secure by Letters Patent is:

1. In a device of the character described, a mandrel member having a bore therethrough and having spaced slots therein communicating with the bore, clamping members mounted in said slots, means in said bore engageable with said clamping members to urge the same outwardly in said slots into engagement with the inner surface of a pipe into which the mandrel member is inserted, means engaged with said urging means to effect movement thereof toward said clamping members to lock the clamping members in pipe engaging position, a die member rotatably mounted on said mandrel member, and means for rotating said die member to chase threads on said pipe.

2. In a device of the character described, a mandrel member having a bore therethrough, a mandrel member removably mounted on the first-named mandrel member having a bore therethrough and having spaced slots therein communicating with the bore, clamping members mounted in said slots, a cam member in said bores engageable with said clamping members to urge the same outwardly in said slots into engagement with the inner surface of a pipe into which the second-named mandrel member is inserted, a cammed lever engaged with said cam member to effect movement thereof toward said clamping members to lock the clamping members in pipe engaging position, a die member rotatably mounted on said mandrel members, and means for rotating said die member to chase threads on said pipe.

3. In a device of the character described, a mandrel member having a bore therethrough and having spaced slots therein communicating with the bore, clamping members mounted in said slots, a cam member in said bore engageable with said clamping members to urge the same outwardly in said slots into engagement with the inner surface of a pipe into which the mandrel member is inserted, means engaged with said cam member to effect movement thereof toward said clamping members to lock the clamping members in pipe engaging position, a die member rotatably mounted on said mandrel member, means for rotating said die member to chase threads on said pipe, and means normally urging said cam member out of engagement with said clamping members.

4. In a device of the character described, a mandrel member having a bore therethrough, a mandrel member removably mounted on the first-named mandrel member having a bore therethrough and having spaced slots therein communicating with the bore, clamping members mounted in said slots, a cam member in said bores engageable with said clamping members to urge the same outwardly in said slots into engagement with the inner surface of a pipe into which the second-named mandrel member is inserted, a cammed lever engaged with said cam member to effect movement thereof toward said clamping members to lock the clamping members in pipe engaging position, a die member rotatably mounted on said mandrel members, means for rotating said die member to chase threads on said pipe, and means normally urging said cam member out of engagement with said clamping members.

5. In a device of the character described, a mandrel member having a bore therethrough and having spaced slots therein communicating with the bore, clamping members mounted in said slots, means in said bore engageable with said clamping members to urge the same outwardly in said slots into engagement with the inner surface of a pipe into which the mandrel member is inserted, means engaged with said urging means to effect movement thereof toward said clamping members to lock the clamping members in pipe engaging position, a die member rotatably mounted on said mandrel member, means for rotating said die member to chase threads on said pipe, and means normally retaining the clamping members in retracted condition relative to said slots.

6. In a device of the character described, a mandrel, means on the mandrel engageable within a pipe upon which threads are to be chased, a housing rotatably mounted on the mandrel, a thread cutting die on the housing engageable with the pipe, means to rotate the housing and die for chasing threads on said pipe, and means normally urging the housing and die in the direction of said pipe.

7. In a device of the character described, a mandrel engageable within a pipe upon which threads are to be chased, means for clamping said mandrel in said pipe, a sun gear rotatably mounted on said mandrel, a spider fixed to said mandrel, planetary gears mounted on said spider enmeshed with the sun gear, a housing rotatably mounted on the mandrel having an internal gear meshed with said planetary gears, said sun gear extending exteriorly of the housing, means engaged with the sun gear for rotating the same, and a die mounted on said housing and engageable with the pipe to cut threads therein in response to rotation of the housing.

8. In a device of the character described, a mandrel engageable within a pipe upon which threads are to be chased, means for clamping said mandrel in said pipe, a sun gear rotatably mounted on said mandrel, a spider fixed to said mandrel, planetary gears mounted on said spider enmeshed with the sun gears, a housing rotatably mounted on the mandrel having an internal gear meshed with said planetary gears, a die mounted on said housing and engageable with the pipe to cut threads therein, and means normally urging the housing and die in the direction of said pipe.

9. In a device of the character described, a mandrel engageable within a pipe upon which threads are to be chased, means for clamping said mandrel in said pipe, a sun gear rotatably mounted on said mandrel, a spider fixed to said mandrel, planetary gears mounted on said spider enmeshed with the sun gear, a housing rotatably mounted on the mandrel having an internal gear meshed with said planetary gears, a die mounted on said housing and engageable with the pipe to cut threads therein, means normally urging the housing and die in the direction of said pipe, and means mounted on the mandrel in engagement with said sun gear exteriorly of the housing for actuating the sun gear to rotate the die.

10. In a device of the character described, a mandrel, means on the mandrel engageable within a pipe upon which threads are to be chased, a housing rotatably mounted on the mandrel, a thread cutting die on the housing engageable with the pipe, means to rotate the housing and die for chasing threads on said pipe, and means rotatably mounted on the housing for suspending the same and facilitating urging the die in the direction of the pipe.

11. In a device of the character described, a mandrel engageable in a pipe and having a longitudinally arranged slot, a die rotatably mounted on the mandrel and engageable with the outer surface of the pipe, a member slidably mounted in said mandrel slot for clamping the mandrel to the pipe, means for rotating said die to chase threads in the pipe, and a spring mounted on the mandrel in engagement with said member normally urging the clamping member of the mandrel out of engagement with the pipe.

12. In a device of the character described, a mandrel, means on the mandrel engageable with the interior of a pipe to anchor the mandrel to the pipe, a die rotatably mounted on the mandrel and engageable with said pipe in thread cutting relation thereto, and a motor supported by said mandrel and operatively connected with the die for rotating the same to chase threads in said pipe.

13. In a device of the character described, a mandrel, means on the mandrel engageable within a pipe upon which threads are to be chased, a housing mounted on the mandrel, a rotatable die supported by the housing and engageable with the pipe in thread cutting relation thereto, means to rotate the die for chasing threads on said pipe, and means for urging the die in the direction of said pipe.

JAMES P. BIRD.
FRED B. SCHAFFER.